United States Patent [19]

Frimley

[11] 4,157,483
[45] Jun. 5, 1979

[54] BRUSH MOUNTING FOR DYNAMO-ELECTRIC MACHINE

[75] Inventor: Charles H. Frimley, Windsor, England

[73] Assignee: Trico Products Corporation, Buffalo, N.Y.

[21] Appl. No.: 769,476

[22] Filed: Feb. 17, 1977

[30] Foreign Application Priority Data

Feb. 18, 1976 [GB] United Kingdom ............... 6277/76

[51] Int. Cl.² ........................................... H02K 13/00
[52] U.S. Cl. ..................................... 310/242; 310/71; 310/229
[58] Field of Search ......... 310/229, 40 MM, 239–242, 310/244–247, 232, 238, 71

[56] References Cited

U.S. PATENT DOCUMENTS

| | | | |
|---|---|---|---|
| 2,107,899 | 2/1938 | Mueller | 310/241 |
| 3,165,654 | 1/1965 | Mabuchi | 310/40 MM |
| 3,175,113 | 3/1965 | Simmons | 310/246 |
| 3,311,763 | 3/1967 | Jepson | 310/50 |
| 3,450,916 | 6/1969 | Mabuchi | 310/244 |
| 3,482,135 | 12/1969 | Hurlin | 310/239 |
| 4,041,339 | 8/1977 | Huber | 310/239 |

FOREIGN PATENT DOCUMENTS

| | | | |
|---|---|---|---|
| 871336 | 2/1953 | Fed. Rep. of Germany | 310/239 |
| 2107689 | 8/1972 | Fed. Rep. of Germany | 310/239 |

*Primary Examiner*—R. Skudy
*Attorney, Agent, or Firm*—E. Herbert Liss

[57] ABSTRACT

A brush support combination is provided for dynamo-electric machines in which brushes are continuously urged against a commutator or slip ring. Each brush is carried by a brush arm which is in turn supported on a lead terminal of the machine. The lead terminals may be supported on an open ended motor housing or on an end cap which closes the open ended housing. The brush arm is formed of electrically conductive, flat resilient stock which supports a brush at one end. The other end is formed into a bight, the free end of which projects outwardly. The bight extends through an opening in the lead terminal, entry to which may be achieved through a throat communicating with the opening. In use the bight resiliently engages the edges defining the opening to retain the brush arm and to provide electrical contact with the terminal.

6 Claims, 6 Drawing Figures

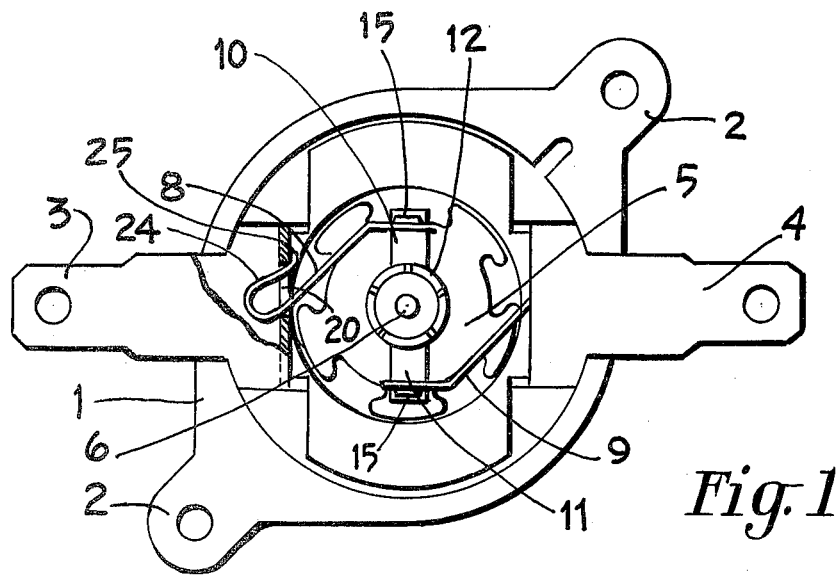
Fig. 1
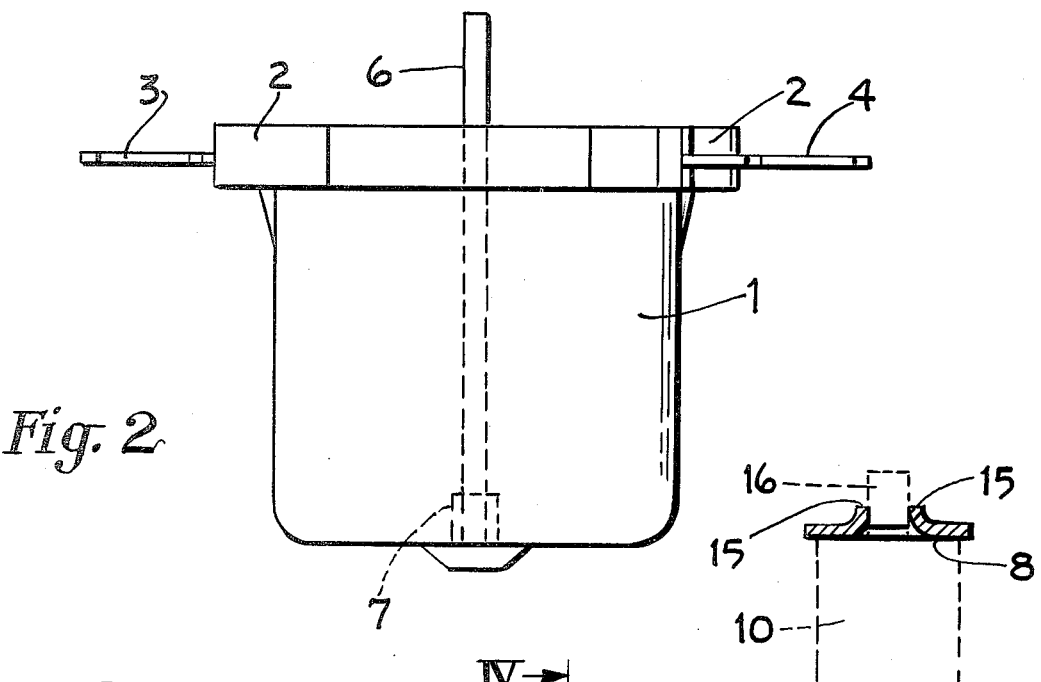
Fig. 2
Fig. 4
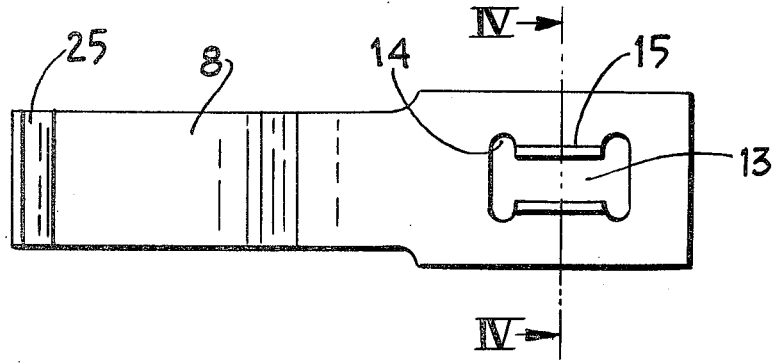
Fig. 3

BRUSH MOUNTING FOR DYNAMO-ELECTRIC MACHINE

BACKGROUND OF THE INVENTION

The present invention relates to the releasable mounting in dynamo-electric machines of resilient brush arms which electrically connect commutator or slip-ring brushes to respective lead terminals.

Conventionally, the arms are not releasably mounted, but are either integrally formed with the terminals or are rigidly fixed thereto by, for example, riveting. However, these arrangements suffer from the important disadvantage that the entire brush arm/terminal unit has to be replaced in the event of its failure or wear, which inevitably means breaking one or more of the electrical connections (such as soldered joints) between the terminals and their respective leads. A further disadvantage is that the arms are prone to being accidentally bent during assembly, with the result that the brushes bear against, say, the commutator too lightly, or at the wrong position, or even lose contact with the commutator altogether.

SUMMARY OF THE INVENTION

According to the present invention a brush which is continuously urged against a commutator or a slip-ring in a dynamo-electric machine is carried by one end portion of a resilient and electrically conductive brush arm. The other end portion of the arm is bent back upon itself to form a loop or a bight which projects through an opening in a lead terminal. The loop engages internal edges defining the opening in the lead terminal thereby retaining the brush arm in position and also providing electrical contact therewith. A portion of the free end of the bight extends outwardly from the loop to form a stop for locating the brush arm with respect to the terminal.

The present invention thus allows damaged or worn brush arms to be replaced without the need to break the above-mentioned electrical connections between the terminals and their respective leads. Preferably, the brush arms are readily inserted into the openings in the terminals with a slight snap-action, not being significantly deformed until they are assembled around the commutator or the slip-ring, so that there is only a minimal risk of the brush arms being accidentally bent. Indeed, before their assembly around the commutator or the slip-ring, the brush arms can be merely loosely held in the openings.

The principle object of the present invention is to provide a brush arm and terminal construction in a dynamo-electric machine which facilitates assembly and replacement of the brush arms.

Another object of the invention is to provide a brush arm and terminal construction which minimizes the risk of the brush arm being accidentally bent during assembly.

Other objects and advantages of the invention will be apparent from the following detailed description with reference being had to the accompanying drawings.

BRIEF DESCRIPTION OF THE DRAWINGS

FIG. 1 is an end view of a first motor with its cap removed;

FIG. 2 is a side view of the motor shown in FIG. 1;

FIG. 3 is a plan view showing the brush arm;

FIG. 4 is a cross-section taken along the line IV—IV of FIG. 3;

FIGS. 1 and 2 of the accompanying drawings illustrate a miniature d.c. electric motor having an open-ended plastics casing 1 which can be secured to a suitable base by a pair of laterally-projecting apertured lugs 2. A sleeve (not shown) formed of a permanently magnetic material is moulded into the casing 1 during its manufacture to provide a two-pole permanent magnetic field.

Figure 5:
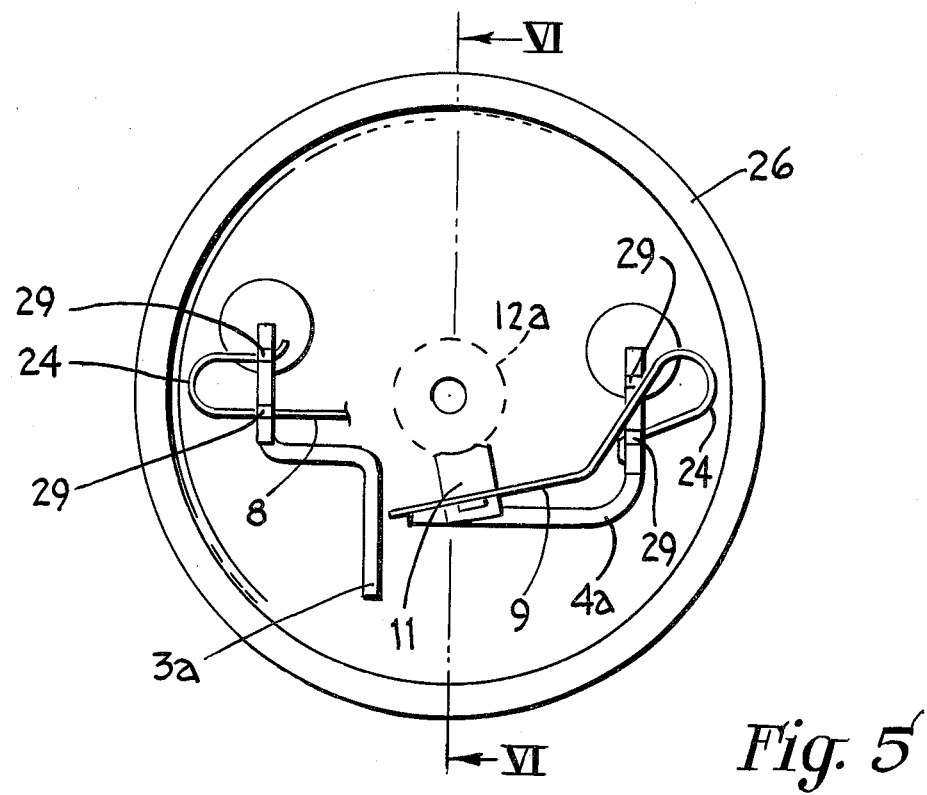
FIG. 5 is an elevational view of the inside of a cap illustrating a modified embodiment of the invention, one of the brush arms being illustrated in its natural substantially undeformed condition, with the other brush arm being illustrated in the deformed condition it assumes when assembled with the commutator; and, FIG. 6 is a cross-section taken along the line VI—VI of FIG. 5, but omitting some features for clarity.

An upper part of the casing 1, as shown in FIG. 2, is shaped to receive and retain a pair of L-shaped terminals 3 and 4, each terminal being formed with a hole to which a lead (not shown) can be secured in known manner. The lower part of the casing 1 receives an armature 5 carried by a shaft 6, one end of which is supported by a thrust bearing 7 at the base of the casing, and the other end passing through a further bearing in a plastics cap (not shown) for closing the open end of the casing. The terminals 3 and 4 support brush arms 8 and 9, respectively, which themselves support a respective pair of carbon brushes 10 and 11. When assembled, the arms 8 and 9 are resiliently deformed and continuously urge the brushes 10 and 11 against a commutator 12, which is electrically connected in known manner to windings on the armature 5.

The present novel manner of mounting an arm to its adjacent terminal is illustrated in FIG. 1, but it will be convenient to describe first, with references to FIGS. 3 to 4, a particularly preferred method by which a brush can be mounted to its arm.

An end portion of said preferred brush arm is formed with a slot 13 having widened end portions 14 and upstanding side edges 15. The brush 10, shown in dotted outline in FIG. 4, is formed of carbon and has a tongue 16 which is forced into the slot 13 and gripped by the edges 15. Preferably, the side faces of at least the tongue 16 are reinforced with a layer of copper, or other relatively hard conducting material, so as to avoid direct contact between the carbon of the brush 10 and the biting edges 15 of the slot 13. Although a particular manner of mounting the brush on its arm has been shown and described it will, of course, be understood that the brush may be mounted to its arm in any suitable or desirable manner.

As clearly shown in FIG. 1 the end portion of the arm 8 remote from the brush 10 is shown bent back upon itself to form a loop or bight, the free end of which has a further bend portion extending outwardly of the loop. In use, a bight 24 of the loop projects through a rectangular opening 20 in the terminal 3, and said further bent portion acts to help locate the arm 8 relatively to the terminal 3 in such a manner that the brush 10 bears against the commutator 12 at the correct position and with the correct pressure. Preferably, the entire free end of the loop is bent as indicated at 25, but in an alternative arrangement the bent end 25 is replaced by a struck-out tab.

The smallest transverse dimension of the unstressed loop 24 is preferably only slightly greater than the corresponding dimension between an opposed pair of side edges defining the opening 20 so that, after being inserted with a slight snap-action, the arm 8 is loosely held therein. The arm 8 does not become securely retained in the opening 20 until it is resiliently deformed to allow the brush 10 to bear against the commutator 12. In this significantly deformed condition, the loop preferably engages both, but at least one, of said opposed pair of side edges of the opening 20 (as shown in FIG. 1) to provide a continuous electrical connection between the brush 10 and the terminal 3.

Figure 6:
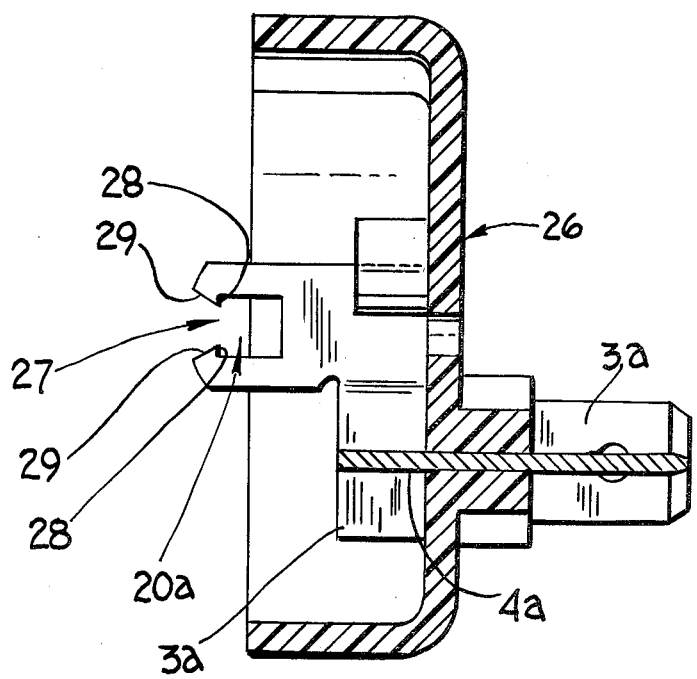

FIGS. 5 and 6 of the accompanying drawings show an alternative electric motor in which terminals 3a and 4a are carried by a plastics cap 26 for closing an open-ended casing (not shown) generally similar to that described hereinabove with reference to the first embodiment of the present invention.

Each of the terminals 3a and 4a is formed with a rectangular opening 20a, as well as a throat 27 which connects with the adjacent opening along a central part of the length of one of its walls. The arrangement thus provides, for each terminal, a pair of shoulders 28 which act to help retain the loop of a brush arm which has been inserted into the opening 20a through the throat 27. Preferably, those surfaces 29 of the terminals defining the throats 27 taper towards one another as they approach the openings 20a, thereby acting as cams or lead-ins to assist in entry of the brush arms into the openings.

It should be noted that FIG. 5 partially illustrates brush arm 8 in its substantially unstressed natural condition, but that brush arm 9 is shown in the resiliently deformed condition it assumes when assembled around a commutator 12a whose periphery is shown in dotted outline.

In both of the above-mentioned embodiments, the presence of the loop 24 greatly reduces the risk of an arm being bent out of shape, whilst at the same time avoiding the need for complicated manufacturing operations. The arms, with their brushes, are readily replaceable should the need to do so arise. It will also be appreciated that the present invention can be utilized with any dynamo-electric machine, the commutators mentioned above being functionally equivalent (as far as the present invention is concerned) to slip-rings both constituting rotatable contacts.

The arms and the terminals are preferably similar if not identical with one another, the arms being formed as strips of phosphor bronze and the terminals being formed of brass.

Certain specific embodiments of the invention have been shown and described for the purpose of illustration but it will be apparent that various modifications and other embodiments are possible within the scope of the invention. It is to be understood, therefore, that the invention is not limited to the specific arrangement shown but in its broadest aspects it includes all equivalent embodiments and modifications which come within the scope of the invention.

What is claimed is:

1. In a dynamo-electric machine having a rotatable contact; the combination comprising a brush arm of electrically conductive, resilient, flat stock having at one end thereof a looped bight portion and an adjacent end portion bent back towards the bight portion and a brush supported at the other end of the brush arm continuously urged against said rotatable contact in operative position, a terminal adopted to be secured to a power source, the terminal having an opening therethrough with internally disposed opposed edges; the brush arm being replaceably mounted in the opening and by means of said bight portion projecting through said opening in resiliently deformed condition from one side of the terminal and making resilient engagement with opposite edges of said opening and the bent back end portion projecting through the opening from the opposite side of the terminal and lying adjacent thereto whereby the brush arm is retained in position and in electrical contact with said terminal, the brush arm extending freely from said opposite side of the terminal to provide resilient support for the brush thereon against the rotatable contact.

2. In a dynamo-electric machine according to claim 1 including an open ended housing wherein said terminal is supported by said housing.

3. In a dynamo-electric machine according to claim 1 including a cap for closing said open ended housing wherein said terminal is carried by said cap.

4. In a dynamo-electric machine according to claim 1 wherein said opening is of rectangular outline.

5. In a dynamo-electric machine according to claim 1 wherein said terminal is formed with a throat connecting with the opening.

6. In a dynamo-electric machine according to claim 5 in which the edges of the terminal defining the throat taper toward each other as they approach the opening.

* * * * *